United States Patent [19]
Yang et al.

[11] Patent Number: 6,005,498
[45] Date of Patent: Dec. 21, 1999

[54] REDUCED KEYPAD ENTRY APPARATUS AND METHOD

[75] Inventors: Deshan Yang, Naperville, Ill.; Jianlin Chen, Beijing, China; Changzheng Kang, Hainesville, Ill.; Wayne Huang, San Diego, Calif.

[73] Assignee: Motorola, Inc., Schaumburg, Ill.

[21] Appl. No.: 08/959,882

[22] Filed: Oct. 29, 1997

[51] Int. Cl.⁶ ................................................. G06F 17/27
[52] U.S. Cl. ........................... 341/23; 341/28; 379/368; 707/535
[58] Field of Search ................................ 341/20, 22, 23, 341/28; 379/300; 707/535; 345/168; 455/564

[56] References Cited

U.S. PATENT DOCUMENTS

| | | | |
|---|---|---|---|
| 4,872,196 | 10/1989 | Royer et al. | 455/564 |
| 5,128,672 | 7/1992 | Kaehler | 341/23 |
| 5,164,900 | 11/1992 | Bernath | 707/535 |
| 5,212,638 | 5/1993 | Bernath | 341/28 |
| 5,360,343 | 11/1994 | Tang | 341/22 |
| 5,835,924 | 11/1998 | Maruyma | 707/535 |
| 5,903,861 | 5/1999 | Chan | 707/535 |
| 5,952,942 | 9/1999 | Balakrishnan | 341/22 |

*Primary Examiner*—Michael Horabik
*Assistant Examiner*—Albert K. Wong
*Attorney, Agent, or Firm*—Sylvia Chen

[57] ABSTRACT

A reduced keypad entry method and apparatus provides a method and apparatus for entry of words using a small number of keypresses on a reduced keypad (210) having multiple symbols associated with at least one key. The method and apparatus uses validity rules (242) to rearrange the order of presentation of the multiple alphabet symbols associated with a single key on the keypad (210), automatically eliminates the presentation of invalid alphabet symbols, and allows the entry of additional information such as a tone markers. Additionally, the method and apparatus uses a dictionary (244) to convert phonetic syllables into Chinese characters.

17 Claims, 3 Drawing Sheets

—PRIOR ART—

REDUCED KEYPAD ENTRY APPARATUS AND METHOD

FIELD OF THE INVENTION

This invention relates generally to entering words into an electronic device using a reduced keypad, and more particularly to entering Chinese characters using phonetic notation on a telephone keypad.

BACKGROUND OF THE INVENTION

A portable hand-held communication device, such as a cellular telephone, typically has less than fifteen keys available for data entry of information for short messaging and address book features. FIG. 1 shows a prior art reduced keypad 100 for an electronic device. The prior art reduced keypad shown is a standard telephone keypad having ten number keys 110–119, a star (*) key 121, and a pound (#) key 122. For English and many other alphabet languages, the numeric keypad of the telephone is overlaid with an alphabet keypad where three or more letters of the alphabet are associated with each number key. For example, the five (5) key 115 is associated with the letters j-k-l. In some reduced keypad electronic devices, upon entering an alphabet entry mode, a user employs multiple key presses to enter letters to make words and names for use by features such short messaging and address book.

For example, once in alphabet entry mode, a user can employ one keypress to select the first letter associated with a depressed key, two keypresses of the same key to select the second letter associated with the key, three keypresses of the same key to select the third letter associated with the key, and so on. Letters are separated using a confirm key, such as the pound (#) key 122.

Chinese and other character-based languages such as Japanese kanji, however, do not have a manageable number of alphabet letters that can be overlaid onto a numeric keypad. For example, Chinese does not use an alphabet and instead has about 5000 to 7000 commonly-used characters. Advantageously, many phonetic systems have been developed to standardize the pronunciation of, for example, Mandarin Chinese. Several of these phonetic systems use the roman alphabet as phonetic symbols, such as the Wade-Giles and the pinyin systems for Mandarin Chinese, and other phonetic systems use a unique phonetic symbol set, such as the zhuyin system for Mandarin Chinese which has a 37-symbol phonetic alphabet. Cantonese Chinese also has a phonetic system using the roman alphabet.

Although there are over 5000 commonly-used Chinese characters, there are only approximately 400 basic phonetic syllables in Mandarin Chinese speech. Thus, the same Mandarin Chinese phonetic syllable is used by many different Chinese characters. An extreme example is the Mandarin Chinese pinyin word "yi"; this phonetic syllable represents over 100 different Chinese characters, each with a different meaning.

Additionally, Mandarin Chinese uses four standard tones to differentiate meanings. Thus, the same phonetic syllable, when pronounced using a different tone, has a different meaning. Using the phonetic word "yi" as an example, at least 20 characters use the first tone, at least 31 characters use the second tone, at least 16 characters use the third tone, and at least 63 characters use the fourth tone.

Although there exist various methods of entering Chinese characters into a computer system using a full-sized keyboard having keys corresponding to all of the phonetic symbols of one of the various phonetic systems and the four tones, there is a need for a reduced keypad entry method for characters for use in a portable hand-held device such as a cellular telephone.

DETAILED DESCRIPTION OF THE PREFERRED EMBODIMENTS

The reduced keypad entry apparatus and method exploits the characteristics of a language notation system to provide a method and apparatus for entry of words such as Chinese characters using a small number of keypresses on a reduced keypad, where multiple alphabet symbols are associated with a single key. The user enters an alphabet symbol by pressing keys on a reduced keypad the proper number of times to obtain the desired symbol on a screen. As the user enters additional alphabet symbols to complete a word, the apparatus and method rearranges the order of presentation of the multiple alphabet symbols associated with a single key on the keypad, automatically eliminates the presentation of invalid symbols, and allows the entry of additional information such as a tone marker. Then, the apparatus and method presents one or more characters that are associated with the entered word and allows the user to select the desired character. The reduced keypad entry apparatus and method allows a Chinese character to be efficiently entered using phonetic symbols on a reduced keypad.

Figure 2:
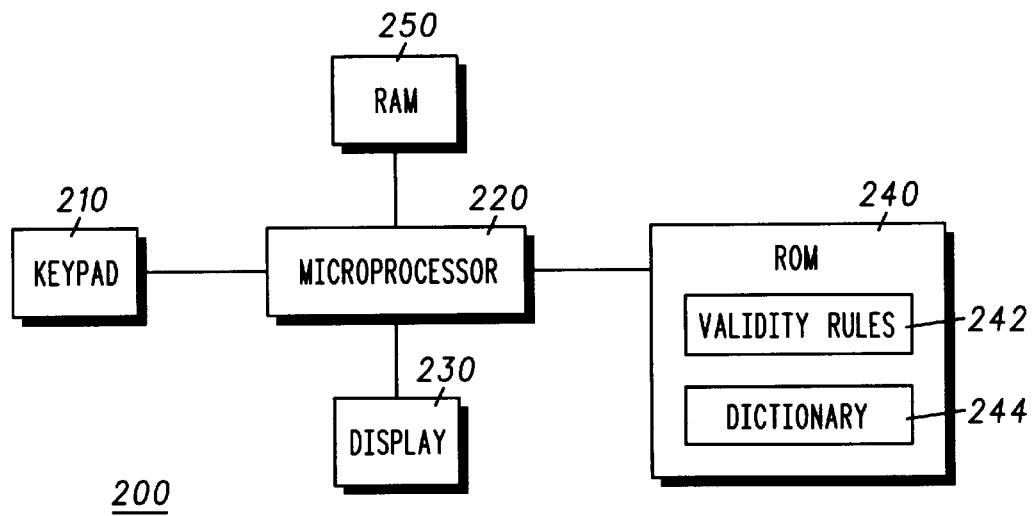
FIG. 2 shows a block diagram of the internal circuitry of a reduced keypad entry apparatus according to a preferred embodiment.

FIG. 2 shows a block diagram of the internal circuitry of a reduced keypad entry apparatus 200 according to a preferred embodiment. The reduced keypad entry apparatus shown is implemented in a cellular telephone, however, it may also be implemented in a standard wired telephone, a personal digital assistant, a facsimile machine, a pager, an electronic label maker, or other electronic devices with reduced keypads, which have fewer keys than alphabet symbols. A keypad 210 and a display 230 are coupled to a microprocessor 220, which takes input from the keypad 210 and also transmits output to the display 230. A memory 240, such as a read-only memory (ROM) is also coupled to the microprocessor 220. This memory 240 is preferably an electrically-erasable read-only memory (EEPROM) holding two separate blocks of information: validity rules 242 and a dictionary 244. Another memory 250, preferably a random-access memory (RAM) is coupled to the microprocessor 220 for storing letters as they are entered via the keypad, a temporary list of Chinese characters associated with an entered phonetic syllable, stored short messages, and address book information.

Figure 3:
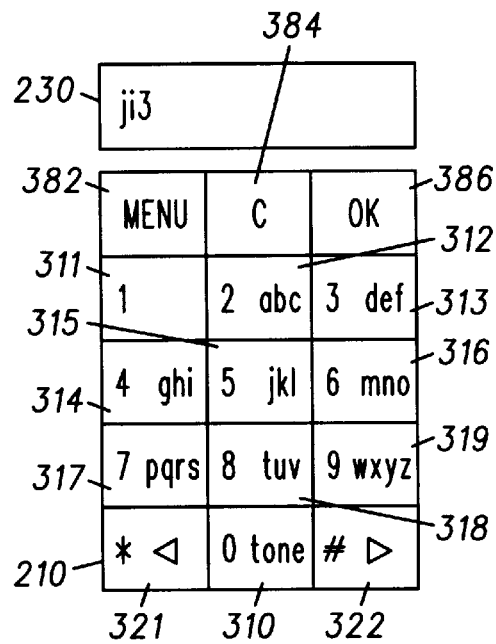
FIG. 3 shows the display and a Chinese character reduced pinyin entry keypad according to a preferred embodiment.

FIG. 3 shows the display 230 and a Chinese character reduced pinyin entry keypad 210 according to a preferred embodiment. The Wade-Giles and pinyin phonetic systems both use the roman alphabet as phonetic symbols for the Mandarin Chinese language. Other language systems using the roman alphabet can also be implemented using the keypad 210. In the embodiment shown, the pinyin system will be used for Chinese character entry.

Figure 1:
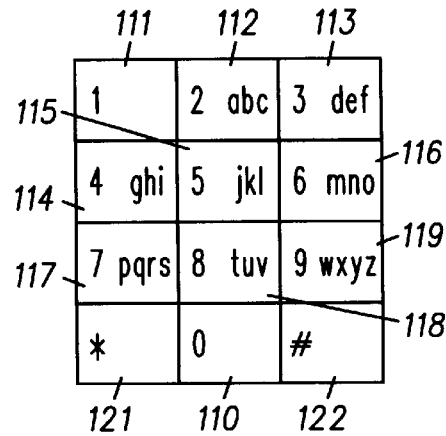
FIG. 1 shows a prior art reduced keypad for an electronic device.

The keypad 210 looks very similar to the keypad 100 shown in prior art FIG. 1. The keypad 210 has twelve standard keys 310–319, 321, 322 marked 0–9, *, and #. The keypad 210 also includes three function keys 382, 384, 386, which will be described in further detail later. The keys 312–319 labeled 2–9 are also labeled with symbols corresponding to letters of the roman alphabet as dictated by the International Telecommunication Union—Telecommunication Standardization Sector (ITU-T) standard.

Number keys 312–319 labeled 2–9 can be used to select one of three or four letters of the roman alphabet. In this embodiment, a user presses the MENU key 382 and selects a "pinyin entry" option. During pinyin entry mode, the number of times a single key is pressed in succession determines the selected roman letter. For example, pressing the five (5) key 315 once, results in a letter j on the display 230, pressing it twice results in a letter k on the display 230, and pressing it three times results in a letter l on the display 230. Pressing the five (5) key 315 additional times cycles through the j-k-l letters again. Other methods of selecting a roman letters using the numeric keypad can be substituted for the method described. For example, another letter entry system uses the star (*) key 321 to scroll through the letters associated with a single number key: 5 * produces a letter j on the screen, 5 * * produces a letter k on the screen, and 5 * * * produces a letter l on the screen.

In Mandarin Chinese, generally each phonetic syllable has an initial, which is a one- or two-letter consonant that begins the syllable, and a final, which is the remainder of the syllable. Some syllables do not have an initial, but all syllables have a final which ranges from one to four letters in length. There are several types of finals, but each final has at least one vowel. In Mandarin Chinese there are 21 initials and 38 finals. Although there are almost 800 possible combinations of initials and finals, only about 400 of these combinations are used in Mandarin Chinese. Thus, Mandarin Chinese phonetic words are highly structured and are also limited in number.

The validity rules 242 in memory 240 shown in FIG. 2 stores in a table which roman letters can be a first letter of a pinyin word and the frequency of each valid first letter. When a key is pressed, the microprocessor 220 orders the presentation of valid first letters on the display 230 according to the validity rules 242. For example, the two (2) key 312 is associated with the roman letters a, b, and c. There are 5 pinyin words that start with the letter a, 16 pinyin words that start with the letter b, and 35 pinyin words that start with the letter c. Because the letter c is the most common first letter associated with the two (2) key 312, the letter c is presented on the display 230 when a user presses the two (2) key 312 once. Pressing the two (2) key 312 a second time presents a letter b on the display 230, and pressing it a third time presents a letter a on the display 230. Pressing the two (2) key 312 additional times scrolls through the letters c-b-a.

The presentation of other roman letters associated with a single key may also be reordered in light of their frequency of occurrence as a first letter of a pinyin word. In the preferred embodiment, the letters associated with the seven (7) key 317 are presented in the order s-p-q-r and the letters associated with the nine (9) key 319 are presented in the order z-y-w-x while the letters associated with the remainder of the number keys are presented in their standard alphabetical order. Also, certain roman letters never begin a pinyin word in Mandarin Chinese. For example, the letters i, u, and v do not begin any pinyin words and thus are not displayed by the microprocessor 220 when a first letter of a word is being entered. This validity and presentation order information is preferably stored in the ROM 240 shown in FIG. 2 in the validity rules 242 memory.

Once a first letter is selected and exhibited on the display 230, the user presses a different key to start cycling through next letters, or the user presses the pound (#) key 322 to indicate that the desired letter has been entered and then enters an additional letter. Pressing the pound (#) key 322 is necessary in situations where consecutive letters in a pinyin word are both associated with the same number key. For example, the consecutive letters c-a in the phonetic syllable "can" are both associated with the two (2) key 312. Thus, after the letter "c" is displayed on the display 230, the user presses the pound (#) key 322 to confirm the entry of the letter c and then returns to the two (2) key 312 to enter the letter a. In situations apart from the one described above, the use of the pound (#) key 322 between letters in a word is optional. For example, once the "a" in "can" is entered, the user can immediately press the six (6) key 316 to obtain an "n" without first pressing the pound (#) key 322.

The microprocessor 220 presents on the display 230 letters associated with a selected number key depending on its frequency of occurrence following the first letter. For example, if the letter j is the first letter of a pinyin word, a valid second letter can only be a letter i or a letter u. Thus, if a user presses the five (5) key 315 and then the four (4) key 314, the display 230 will show the phonetic word "ji" in only two keystrokes. In the preferred embodiment, when only one letter associated with a keypress is valid, the microprocessor 220 will automatically cause the display 230 to show the valid letter continuously. If more than one letter associated with a single keypress is valid, the microprocessor 220 will cause the presently displayed letter to blink on the display 230 thus indicating that other valid options exist. Because the ROM 240 stores information regarding the occurrence of each letter depending on its position in a word, it can be used to direct the continuous display or blinking display of the letter.

When the phonetic syllable has been fully entered, the user has the option of selecting a tone value to indicate the tone of the syllable. Tone values can be selected using the zero (0) key 310. An alternate to the zero (0) key is the one (1) key 311, because it also does not have letters associated with it. Pressing the zero (0) key 310 once results in a first tone marker on the screen (1 or "-" depending on the implementation), pressing the zero (0) key 310 again results in a second tone marker (2 or "/") on the screen, and so on for the third tone (3 or ∨) and fourth tone (4 or \). Pressing the zero (0) key 310 five times removes the tone marker, and pressing it more than five times in succession cycles through the tones again. Preferably, the microprocessor 220 automatically skips invalid tone markers like it automatically skips invalid letters based on the information stored in the ROM 240. Thus, the number of keystrokes needed to enter a phonetic syllable and an associated tone marker can be reduced.

At any point during the phonetic syllable entry, a user can erase a roman letter or tone marker using the clear (C) key 384. After a user presses the OK key 386 to indicate that the word is completely entered, the microprocessor 220 shown in FIG. 2 initiates a search through the dictionary 244 in ROM 240 for all possible Chinese characters associated with the entered phonetic syllable. If no tone marker is entered, the microprocessor 220 will present on the display 230 all of the characters associated with the phonetic syllable alone ordered by frequency of use. If a tone marker is entered, only the characters associated with the entered phonetic syllable and tone marker are presented, again ordered by frequency of use. The eligible Chinese characters are loaded into the RAM 250 for display. In this embodiment, five Chinese characters appear on the display 230 at a time, and the user can select one of the five displayed characters using the 1–5 number keys 311–315 or scroll forward to the next set of five character alternatives using the pound (#) key 322. The star (*) key 321 also allows a user to scroll backwards through the character alternatives five at a time.

Figure 4:
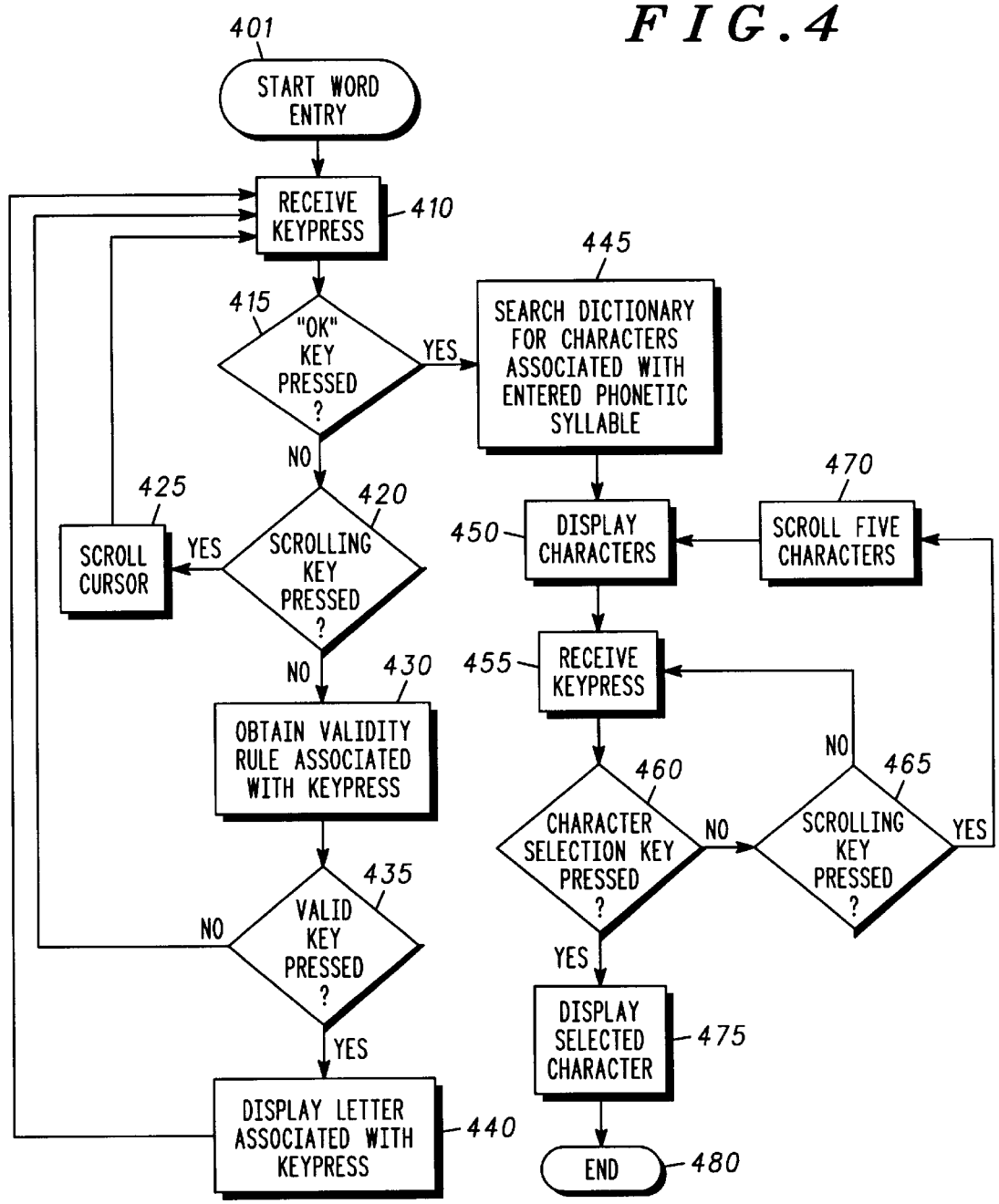
FIG. 4 shows a simplified flow chart of the reduced keypad entry method in a preferred embodiment.

FIG. 4 shows a simplified flow chart of the reduced keypad entry method in a preferred embodiment. The flow chart begins with start step 401 when the user selects the menu option of entering phonetic syllables into the electronic device using MENU key 382 shown in FIG. 3. In step 410 the microprocessor 220 receives information regarding a keypress from the keypad 210 shown in FIG. 2. In the first decision step 415, the microprocessor 220 determines if the OK key 386 shown in FIG. 3 has been pressed. If not, the microprocessor 220 determines if a scrolling key, such as the star (*), pound (#), or clear (C) key 321, 322, 384 shown in FIG. 3, has been pressed. If a scrolling key has been pressed, the microprocessor 425 scrolls the cursor as directed and returns to step 410. If no scrolling key has been pressed, the microprocessor 220 obtains the validity rule associated with the received keypress from the validity rules 242 section of the ROM 240 shown in FIG. 2.

There are various validity rules depending on whether the keypress is a first letter of a word, a next letter of a word, or a tone marker. The microprocessor 220 uses the proper validity rule to determine in step 435 if a valid key has been pressed. If a valid key has not been pressed, the microprocessor 220 returns to step 410 without displaying a roman letter on the display 230 shown in FIG. 2. If a valid key was pressed, in step 440 the microprocessor 220 displays the most frequently encountered valid letter associated with the keypress on the display 230 and returns to step 410. If subsequent keypresses are presses of the same key, the microprocessor 220 will scroll through all of the valid letters associated with the key in order of priority according to the validity rules. If subsequent keypresses are different keys, the microprocessor will add roman letters or a tone marker to the word being built on the display 230.

Once the OK key 386 shown in FIG. 3 has been pressed as determined by step 415, in step 445 the microprocessor 220 searches the dictionary 244 in the ROM 240 shown in FIG. 2 for Chinese characters associated with the entered pinyin word. The microprocessor 220 then displays the five most frequently used Chinese characters on display 230 in step 450 and receives a keypress in step 455. If the pressed key is not a character selection key as determined by step 460, the microprocessor 220 determines if the pressed key is a scrolling key in step 465. If a scrolling key, such as the star (*) or pound (#) key 321, 322 was pressed, the microprocessor 220 causes the next or previous five frequently-used characters to be shown on display 230. If neither a character selection key nor a scrolling key was pressed, the microprocessor 220 assumes the keypress was an error and simply returns to step 455.

If a character selection key was pressed as determined by step 460, the display 230 is cleared and the selected character is displayed and entered into the RAM 250 shown in FIG. 2. Once a character has been entered, the flow chart ends in step 480. The user can start again with step 401 by simply remaining in the phonetic entry mode and entering in a new word.

Figure 5:
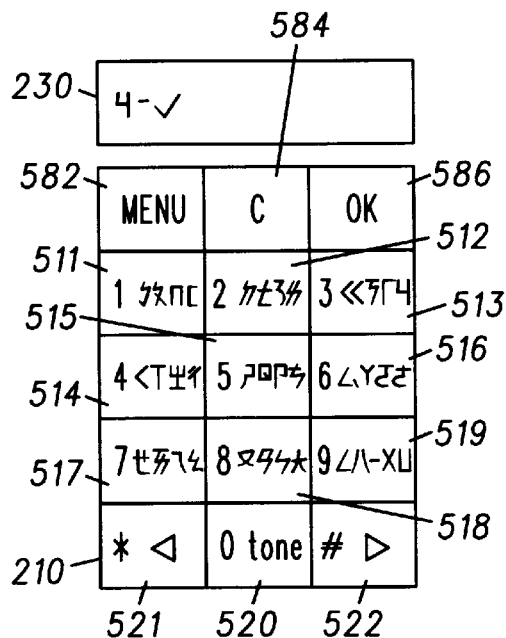
FIG. 5 shows a Chinese character reduced zhuyin entry keypad according to a preferred embodiment.

This reduced keypad entry apparatus and method can be used not only for pinyin word entry but also zhuyin phonetic entry for Chinese characters. FIG. 5 shows a Chinese character reduced zhuyin entry keypad according to a preferred embodiment. There is a one-to-one correspondence between the pinyin initials and finals and the zhuyin initials and finals. Because there are more zhuyin letters than roman letters, zhuyin letters are associated with the one (1) key 511 as well as the number keys 512–519 labeled 2–9. The MENU, clear (C), OK, zero (0), and scrolling keys 582, 584, 586, 520, 521, 522 are used analogously to the MENU, clear (C), OK, zero (0), and scrolling keys of the pinyin keypad shown in FIG. 3. The block diagram shown in FIG. 2 and the flow chart shown in FIG. 4 can be applied directly to the zhuyin keypad with only a change in the validity rules 242 and dictionary 244 information stored in the ROM 240 to tailor the device to zhuyin phonetics. The validity rules 242 in this zhuyin embodiment also applies the principles of reordering or eliminating the presentation of letters according to their frequency of use as either a first letter or a next letter. Also, because the zhuyin overlay onto a numeric keypad is not dictated by any ITU-T standards, the letters associated with a particular number key can be changed to increase efficiency in entering a zhuyin word.

Thus, the reduced keypad entry method and apparatus provides a method and apparatus for entry of words using a small number of keypresses on a reduced keypad. The method and apparatus uses priority rules to rearrange the order of presentation of the multiple alphabet symbols associated with a single key on the keypad, automatically eliminates the presentation of invalid alphabet symbols, and allows the entry of additional information such as a tone value. While specific components and functions of the reduced keypad entry method and apparatus are described above, fewer or additional functions could be employed by one skilled in the art within the true spirit and scope of the present invention. The invention should be limited only by the appended claims.

We claim:

1. A method of reduced keypad entry on a reduced keypad having at least one key associated with multiple symbols comprising the steps of:

receiving a first keypress of a key;

obtaining a validity rule associated with the first keypress;

determining a presentation order of symbols associated with the key using the validity rule; and displaying a first symbol associated with the key according to the presentation order.

2. A method according to claim 1 wherein the step of displaying comprises the steps of:

determining if a second symbol is associated with the key according to the presentation order;

if a second symbol is associated with the key, blinkingly displaying the first symbol; and if a second symbol is not associated with the key, continuously displaying the first symbol.

3. A method according to claim 2 further comprising the steps of:

receiving a second keypress of the key; and displaying a second symbol associated with the key according to the presentation order.

4. A method according to claim 1 wherein the presentation order indicates frequency of use of each symbol associated with the key.

5. A method according to claim 1 further comprising the steps of:

receiving a keypress indicating that a word has been entered;

searching a dictionary for at least one character associated with the word; and displaying the at least one character.

6. A method according to claim 5 wherein the step of displaying comprises the step of:

presenting the at least one character in an order corresponding to its frequency of use.

7. A method according to claim 6 further comprising the step of:

obtaining a character selection keypress.

8. A method according to claim 7 further comprising the step of:

entering a character associated with the character selection keypress into a memory.

9. A reduced keypad entry apparatus comprising:

a microprocessor;

a reduced keypad coupled to the microprocessor having at least one key associated with multiple symbols;

a display coupled to the microprocessor;

a random-access memory coupled to the microprocessor; and a read-only memory coupled to the microprocessor having:

a dictionary memory; and a validity rule memory.

10. An apparatus according to claim 9 wherein the dictionary memory omprises:

a table associating characters with phonetic syllables.

11. An apparatus according to claim 10 wherein the characters are Chinese characters and the phonetic syllables are pinyin words.

12. An apparatus according to claim 10 wherein the characters are Chinese characters and the phonetic syllables are zhuyin words.

13. An apparatus according to claim 9 wherein the validity rule memory comprises:

a table associating valid symbols with each at least one key.

14. An apparatus according to claim 13 wherein the table indicates a frequency of occurrence of each valid symbol.

15. An apparatus according to claim 9 wherein the validity rule memory comprises:

a table associating valid tone markers with phonetic syllables.

16. An apparatus according to claim 9 wherein the validity rule memory comprises:

a list of valid initial phonetic syllable symbols.

17. An apparatus according to claim 9 wherein the validity rule memory comprises:

a list of valid non-initial phonetic syllable symbols.

* * * * *